(12) United States Patent
Wainwright (10) Patent No.: US 7,073,932 B2
(45) Date of Patent: Jul. 11, 2006

(54) OPTICAL FIBER DECORATIVE ASSEMBLY

(76) Inventor: Harry Lee Wainwright, 950 Pembroke Rd., Bethlehem, PA (US) 18017-7026

( * ) Notice: Subject to any disclaimer, the term of this patent is extended or adjusted under 35 U.S.C. 154(b) by 0 days.

(21) Appl. No.: 10/903,339

(22) Filed: Jul. 30, 2004

(65) Prior Publication Data

US 2005/0024893 A1    Feb. 3, 2005

Related U.S. Application Data (60) Provisional application No. 60/491,429, filed on Jul. 31, 2003.

(51) Int. Cl.
  *F21V 8/00* (2006.01)
  *F21V 31/00* (2006.01)
(52) U.S. Cl. .................. 362/565; 362/563; 362/555
(58) Field of Classification Search ............... 362/122, 362/123, 555, 556, 563, 564, 565, 567, 568, 362/806
  See application file for complete search history.

(56) References Cited

U.S. PATENT DOCUMENTS

| | | | |
|---|---|---|---|
| 3,624,385 A * | 11/1971 | Lamar | ............ 362/565 |
| 4,034,215 A * | 7/1977 | Hashimoto | ............ 362/565 |
| 4,471,412 A * | 9/1984 | Mori | ............ 362/565 |
| 4,812,952 A | 3/1989 | Clemens | |
| 4,998,186 A | 3/1991 | Cocca | |
| 5,485,358 A * | 1/1996 | Chien | ............ 362/106 |
| 5,683,762 A | 11/1997 | Banschick | |
| 6,039,453 A * | 3/2000 | Wang | ............ 362/567 |
| 6,076,940 A | 6/2000 | Sanford, Jr. | |
| 6,371,638 B1 | 4/2002 | Zingale et al. | |
| 6,616,292 B1 * | 9/2003 | Lin et al. | ............ 362/565 |
| 6,817,745 B1 * | 11/2004 | Leung et al. | ............ 362/555 |
| 2003/0161154 A1* | 8/2003 | Ouyang et al. | ............ 362/295 |
| 2004/0190284 A1* | 9/2004 | Yang | ............ 362/122 |

* cited by examiner

*Primary Examiner*—Y. My Quach-Lee
(74) *Attorney, Agent, or Firm*—Bereskin & Parr; Isis E. Caulder (57) ABSTRACT

A decorative assembly for use within a floral arrangement includes a plurality of optical fibers, a plurality of light emitting diodes, a base portion, and a power source. The optical fibers each have first and second ends. The light emitting diodes are coupled to the first end of each of the optical fibers for illuminating the optical fibers. The base portion houses the lighting emitting diodes and at least a portion of the optical fibers. The power source is coupled to the light emitting diodes through an optional light driving circuit. The optical fibers are illuminated such that the light emitted at the second end of the optical fibers creates an aesthetically decorative effect within the floral arrangement.

12 Claims, 8 Drawing Sheets

(PRIOR ART)

OPTICAL FIBER DECORATIVE ASSEMBLY

This application claims the benefit under 35 U.S.C. 119(e) of U.S. Provisional Application No. 60/491,429, filed Jul. 31, 2003.

FIELD OF THE INVENTION

This invention relates to a decorative assembly and particularly to an optical fiber decorative assembly for use within floral arrangements.

BACKGROUND OF THE INVENTION

Flower arrangements and potted plants are aesthetically pleasing and commonly purchased for celebratory occasions. Flower arrangements and potted plants are commonly enhanced using novelty products that add aesthetic value. Also, since the flowers in flower arrangements only last for a few days unless they are refrigerated by the florist, the aesthetic appeal of flower arrangements are typically short lived. Accordingly, there exists an ongoing need for decorative articles, particularly decorative articles containing plants, which are aesthetically pleasing, inexpensive and which allow for the flower arrangement to remain aesthetically pleasing for a longer time.

There are a variety of novelty products that are used to enhance the aesthetic appearance of plants such as those disclosed in U.S. Pat. Nos. 4,812,952 and 6,067,940 Specifically, U.S. Pat. No. 4,812,952 discloses a decorative stick-in self lighting article with a decorative top. Specifically, a flexible lighting tube uses chemical which when mixed in a light source that illuminates both the flower or plant and the decorative top for the duration of the illuminating reaction taking place therein. U.S. Pat. No. 6,067,940 discloses a light accessory adapted to be mounted on the edge portion of a planter for illuminating a plant within the planter. However, such attempts result in utility displays that do not significantly enhance the floral arrangement effect or appreciably extend the duration of the decorative effect.

SUMMARY OF THE INVENTION

The invention provides in one aspect, a decorative assembly for use within a floral arrangement, said decorative assembly comprising:
  (a) a plurality of optical fibers, each having a first end and a second end;
  (b) a light emitting diode coupled to the first end of each of said optical fibers for illuminating said optical fibers;
  (c) a base portion for housing said lighting emitting diode and at least a portion of said optical fibers;
  (d) a power source coupled to said light emitting diode;
  (e) said plurality of optical fibers being illuminated such that the light emitted at the second end of said optical fibers creates an aesthetically decorative effect within the floral arrangement.

Further aspects and advantages of the invention will appear from the following description taken together with the accompanying drawings.

DETAILED DESCRIPTION OF THE INVENTION

Referring to FIGS. 1, 2A, 2B, and 2C, illustrated therein is an optical fiber decorative assembly 10 for use with a floral arrangement made in accordance with a preferred embodiment of the present invention. Decorative assembly 10 includes optical fibers 14 and a base portion 12 which includes an LED lighting assembly 15 positioned at one end of the optical fibers 14, a power source 16, and a light driver circuit 18. Light driver circuit 18 is designed to activate the LEDs of LED assembly 15 such that the optical fibers 14 are illuminated and such that points of light are produced at the ends of optical fibers 14. Decorative assembly 10 provides these points of light and floral arrangement 12 results in various aesthetic lighting effects such as "twinkling stars" or "waterfall lights" amongst the leaves and flowers of a flower arrangement as will be described.

Figure 1:
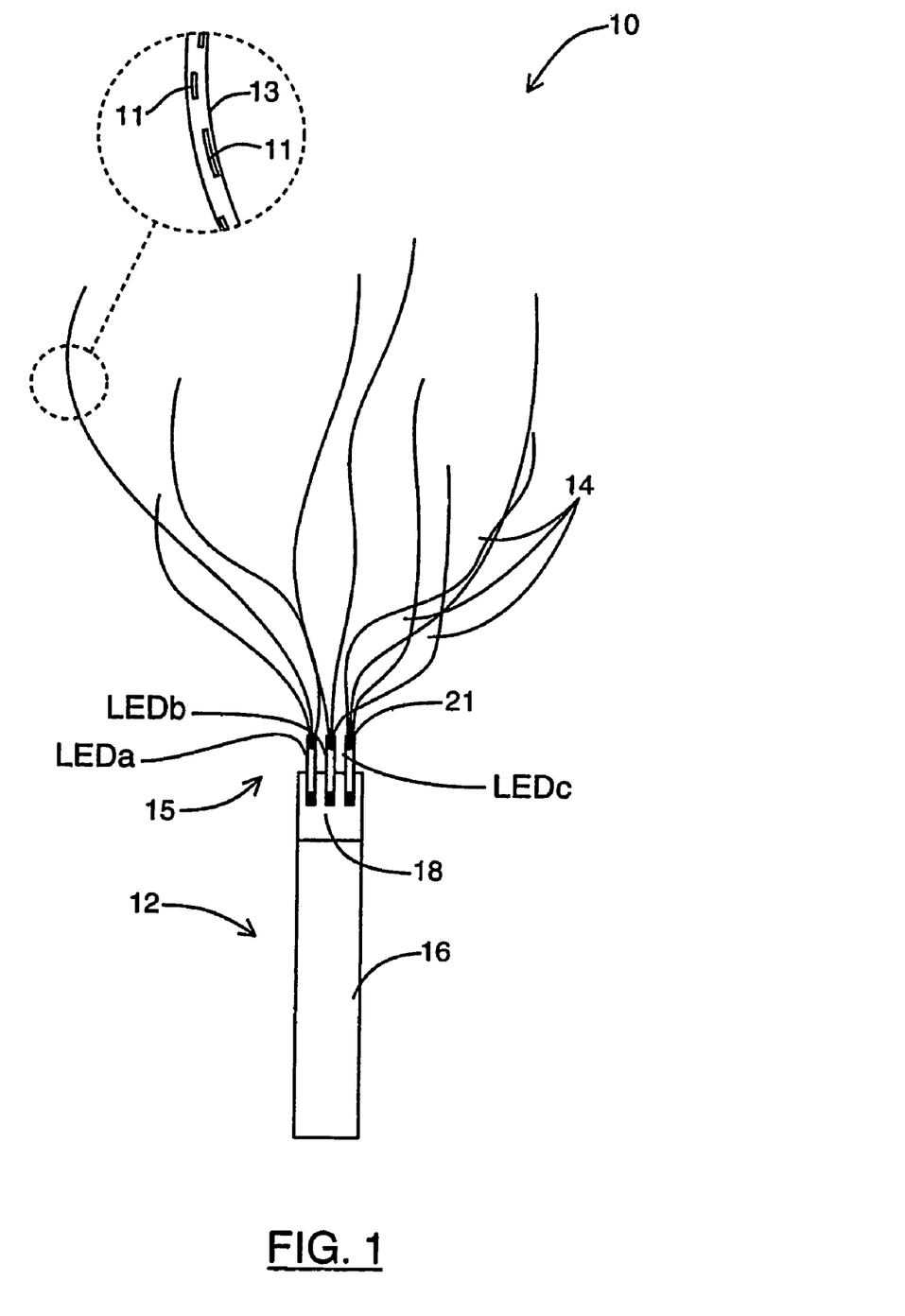
FIG. 1 is a front view of one example decorative assembly of the present invention.

Optical fibers 14 are conventional plastic optical fiber (e.g. standard fiber optic cable manufactured by Mitsubishi Company of Japan) and can be of various thicknesses (e.g. having diameter of 20 mm, 30 mm, and/or 40 mm, etc.). While it is preferred to have at least 20 or 30 individual plastic optical fibers 14 of varying thicknesses intermixed (i.e. some 20 mm, some 30 mm, and some 40 mm fibers), it should be understood that any number of individual optical fibers 14 could be utilized. The outside surfaces of optical fibers 14 are preferably coated with a coating material 13 (e.g. fluorinated polymer, etc.) that is designed to keep the light in the plastic "pipe" so that light is only emitted at the end. This provides the aesthetic optical effect of "points of light". However, while it is preferred to use fully coated optic fibers 14, it should be understood that it is also possible to remove parts (e.g. at points 11 as shown in FIG. 1) of the coating 13 so that light can escape from the sides of the fibers as well.

Figure 2A:
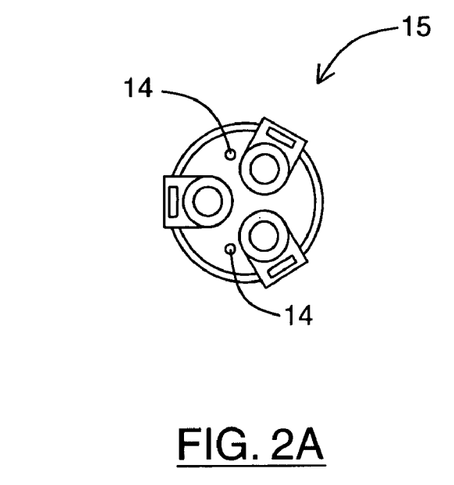
FIG. 2A is a top view of the base portion of the decorative assembly of FIG. 1 illustrating the LED assembly.
Figure 2B:
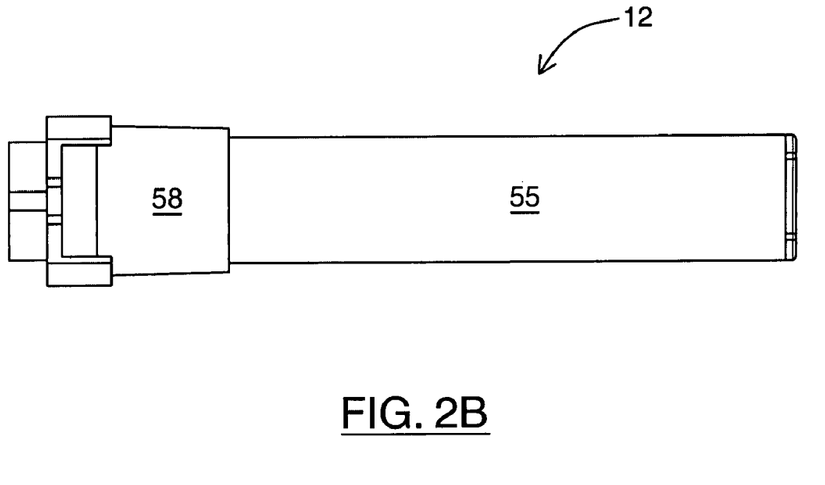
FIG. 2B is a side view of the base portion of the decorative assembly of FIG. 1.
Figure 2C:
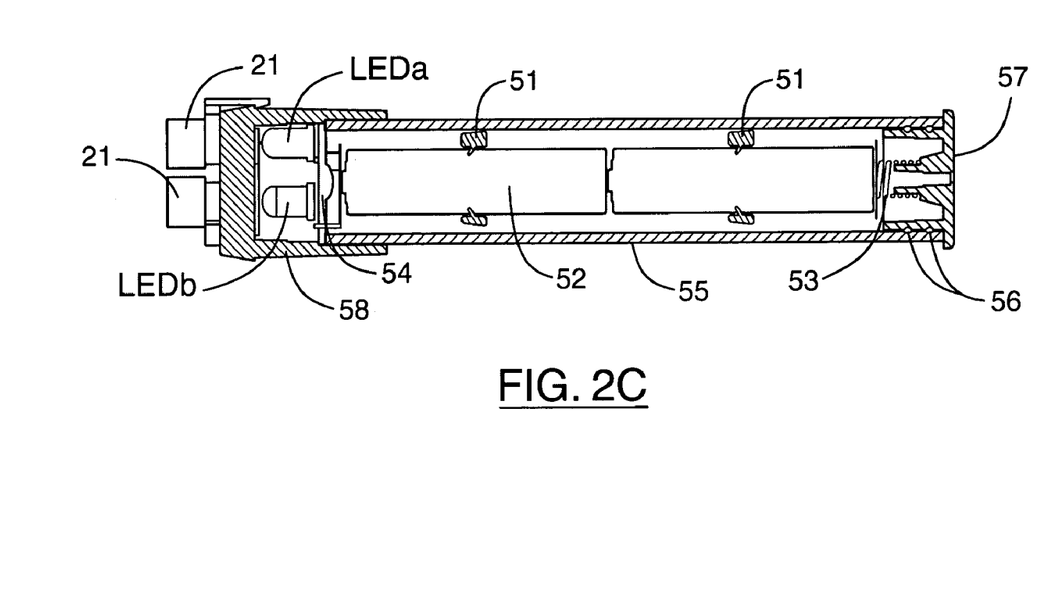
FIG. 2C is a cross-sectional side view of the base portion of the decorative assembly of FIG. 1.

Optical fibers 14 are to be engaged against the LEDs of LED assembly 15. Optical fibers 14 can be held in alignment with the LEDs of LED assembly 15 by means of shrink plastic tubing 21 (FIGS. 1 and 2). Specifically, one or more optic fibers 14 are glued into the other end of the plastic tube 21 using adhesive. As shown in FIG. 2B, and 2C, a front cap 58 is used to hold and shield the LEDs from environmental conditions. Front cap 58 contains cavities within which the LEDs are mounted so that they emit light that is orthogonal to the plane of the top of the base portion 12. An alternate method of coupling the bulb of LEDs to the optical fibers 14 is to also slip shrink plastic tube 21 over the bulb of individual LEDs of the LED assembly 15 and to apply heat to shrink the tubing for a tight fit that can be further enhanced by application of a small amount of adhesive. Either way, the optic fibers 14 are oriented within the plastic tubing 21 such that the end faces of each optic fiber 14 is positioned relatively orthogonal to the top surface of the LED that is secured within the plastic tube 21.

Figure 3A:
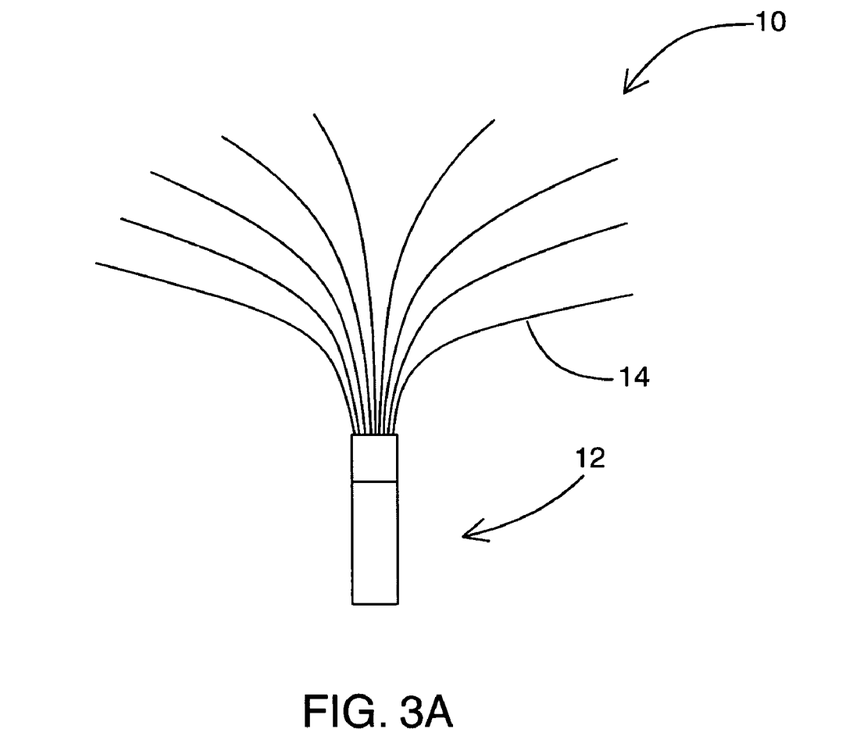
FIGS. 3A and 3B are front views of the decorative assembly of FIG. 1 which illustrate how the optical fibers can be cut to provide varying lengths of fiber in order to obtain different lighting effects.
Figure 3B:
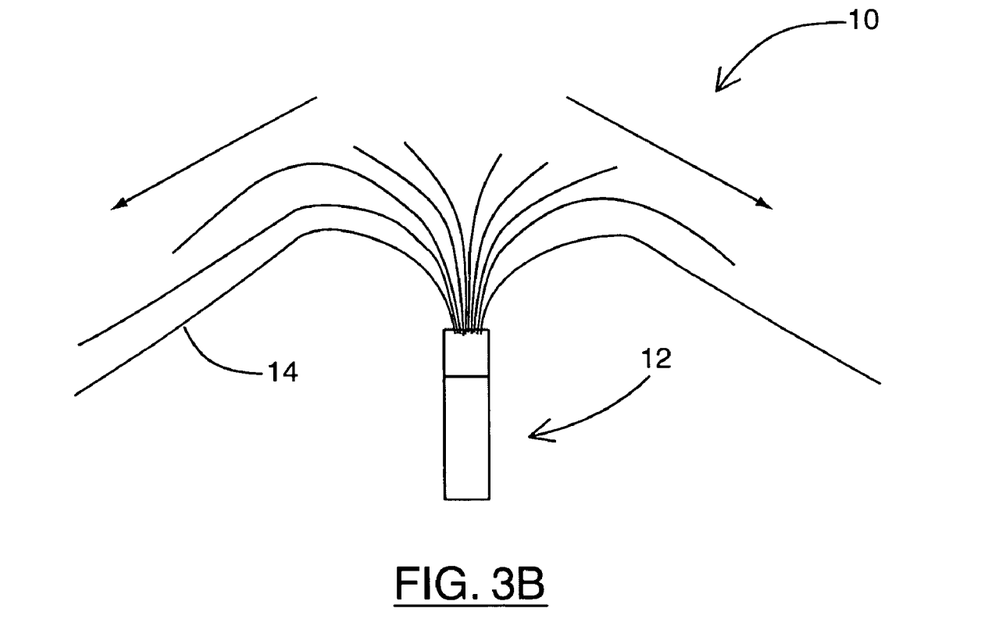

Optical fibers 14 can be of the same length or can be of variable length. That is, optical fibers 14 can be cut at various lengths and this can occur either at the time of manufacture or by the purchaser (e.g. a bulk purchaser florist or individual consumer). Specifically, FIGS. 3A and 3B illustrate how the optical fibers 14 can either be of uniform length (FIG. 3A) or of variable length (FIGS. 1 and 3B). Also, it should be understood that decorative assembly 10 can be adapted for use with various sizes of floral arrangements. Smaller floral arrangements such as corsages can be adorned using shorter lengths of optical fiber 14 (e.g. 2 to 5 cm) and larger bouquets can be adorned using longer lengths of optical fiber 14 (e.g. 20 to 30 cm or larger). In addition extremely large floral displays (e.g. in large dinning rooms etc.) could be adorned with suitable long and thick optical fiber 14 (e.g. 1 to 3 meters or longer).

The variable length arrangement can be either achieved on a custom basis as noted above or can be achieved during manufacturing process. It should be understood that the visual lighting effects that result from using uniform lengths of optic fiber 14 (i.e. FIG. 3A) is a relatively uniform "blur" of color and/or lighting lengths and end spots depending on the lighting sequence that is provided by LED assembly 15. The visual effect that results from variable length optic fiber 14 (i.e. FIGS. 1 and 3B) is more complex. For example, it is possible to provide a "waterfall" type visual effect (i.e. light traveling in the direction indicated by the arrows on FIG. 3B) by cutting the optical fibers 14 so that they gradually get longer and longer from the center out and by alternatively activating the various LEDs within LED assembly 15 so that the shorter ones are activated first and then the mid-side ones and then the longest ones.

LED assembly 15 comprises a plurality of LEDs. For illustrative purposes, three LEDS, namely LEDa, LEDb and LEDc are provided in a triangular pattern in the top of the base portion as shown in FIGS. 1 and 2A. While it is preferred to use three LEDs within LED assembly 15 as shown in FIG. 1, it should be understood that it is possible to use any number of LEDs. It is also possible to use various types of color or non-color LEDs. For example, LEDs, three green LEDs, or three blue LEDs provide a favourable lighting effect as does the use of one red, one blue and one white LED. However, it should be understood that any color combination of LEDs could be used.

As conventionally known, LEDs are semiconductor devices that emit a visible light when current biased in the forward direction. Unlike standard bulb type lamps, LEDs are immune to failure conditions such as filament breakage due to sudden shocks or bumps and are well suited for use in articles that may experience sudden impacts from being bounced or shaken such as candle flame device 10. In addition, LEDs are highly energy efficient as they only require a small amount of electricity to generate a relatively strong light. For example, a typical incandescent lamp operates on 5 volts and uses a current of 115 milliamps while a LED can operate on 3 volts and draw current on the order of 15 milliamps.

Accordingly, LEDs are a particularly desirable lighting source in applications involving small and lightweight devices where the desired size and weight limits the strength of power sources available thereby making energy efficiency important. The LEDs of LED assembly 15 are preferably 5 mm high intensity wide dispersion color LEDs Since the rated lifetime of these LEDs is approximately 15 years, LED assembly 15 provides decorative assembly 10 with an extremely energy efficient, long lasting (i.e. so that decorative assembly 10 can be re-useable), light weight and durable light source.

Base portion 12, as shown in FIGS. 2A, 2B, and 2C, is adapted to house LED assembly 15, power source 16, and light driving circuit 18 (optional as will be discussed). Base portion 12 consists of a tube body 55 which is preferably made out of acrylic and waterproof and a front cap 58 which shields the LED assembly 15. As shown, the shrinkable plastic tubes 21 which hold the optical fibers 14 are positioned at and extending out from the top end of base portion 12. Also, the LEDs from the LED assembly 15 are encased within base portion 12.

Power source 16 is preferably two conventional penlight "AAA" cell batteries 52 secured by battery holder tabs 51 and positioned in series as shown in FIG. 2. By placing the batteries 52 in series, it was possible to increase the brightness of LED assembly 15 since typically this product would typically not need to last more than two to three weeks (i.e. be thrown out once the floral arrangement has expired). However, it should be understood that the batteries 52 could also be positioned in parallel to provide for longer life. Also, it should be understood that base portion 12 could be adapted to allow batteries 52 to be replaced. Batteries 52 are electrically connected to the metal leads of the LEDs of LED assembly 15 using a conventional connector coil 53 and plate 54 assembly which connects to the light driving circuit 18 or directly to the LEDs of LED assembly 15 as will be discussed. As conventionally known, a plastic end cap 57 is provided at the rear of base portion 12 to secure and bias connector coil 53 and plate 54 against batteries 52. O-rings are also positioned within the plastic end cap 57 to provide waterproof sealing.

While the example implementation shown in FIGS. 1 and 2 illustrates the use of two "AAA" cell batteries 52, it should be understood that it would also be possible to use different types of battery power for floral arrangements that are smaller or larger than conventional long stemmed flowers. For example, decorative assembly 10 could be adapted for use with a smaller floral arrangement (e.g. corsages, etc.) by using smaller optical fibers 14 as noted above and by having a smaller base portion 12 sized to fit a smaller cell battery (e.g. the kind used in watches and miniature devices). It is contemplated that for smaller floral arrangements the duration of operation is a low priority and according the short life of a small cell battery is not problematic. Decorative assembly 10 may also be used within larger floral arrangements (e.g. hotel entranceways etc.) and accordingly larger battery power sources would be used, possible even AC-DC adaptors for use with a conventional plug outlet.

It should also be understood that decorative assembly 10 can be activated and deactivated using various types of conventional means including a power switch (not shown) positioned on the outside surface of base portion 12 (e.g. at the bottom) or by plugging and unplugging two connector wires that extend from the base portion 12 together. In any case, it should be understood that many actuation techniques could be used to turn decorative assembly 10 on and off and a "power switch" will be discussed in relation to the detailed description of the light driver circuit 18 below.

Light driver circuit 18 is a conventional LED driving circuit that selectively activates the LEDs of LED assembly 15. Light driver circuit 18 is implemented as a conventional PCB circuit board and is positioned between power source 16 and LED assembly 15 such that the LED leads can be inserted directly into the PCB board. Light driver circuit 18 is adapted to either provide random or sequential activation of the LEDs of LED assembly 15. Also, light driver circuit 18 can be adapted to provide gradually changing (i.e. increasing and/or decreasing) levels of power to the LEDs to create "fade" lighting effects. Finally, the speed at which random, sequential or gradually changing levels of power are provided to the LEDs can be adjusted depending on the type of effect desired. While the example implementation of decorative assembly 10 (FIG. 1) is being illustrated as using light driver circuit 18, it should be understood that if commercially available "blinking" LEDs are utilized within LED assembly then it would not be necessary to use a light driver circuit 18 within decorative assembly 10.

Figure 4A:
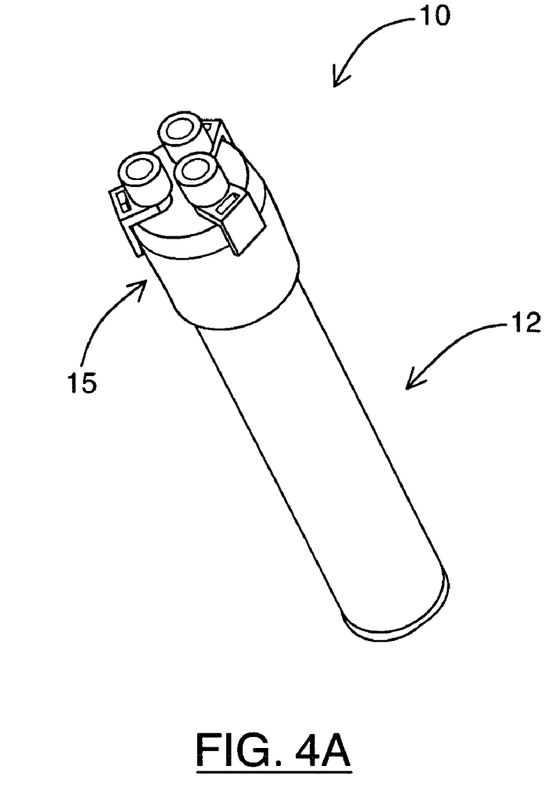
FIGS. 4A and 4B are perspective and cross-sectional views of the base of the decorative assembly of FIG. 1, respectively.
Figure 4B:
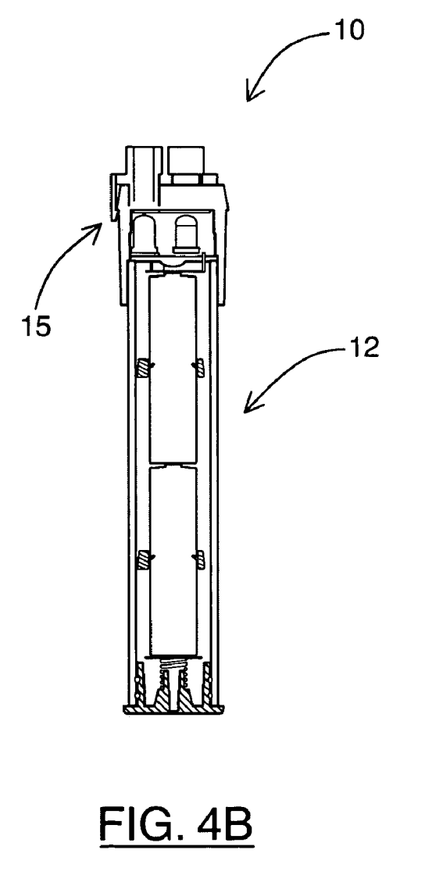

FIGS. 4A and 4B illustrate the outside and cross-sectional aspects of base portion 12 illustrating the relative position of the three LEDs of LED assembly 15 and the power source 16 and light driver circuit 18. Power source 16 and light driver circuit 18 (optional) are enclosed by base portion 12 which is constructed out of a water resistant material (e.g. rubber) and which provides an air-tight enclosure for power source 16 and light driver circuit 18.

Figure 5:
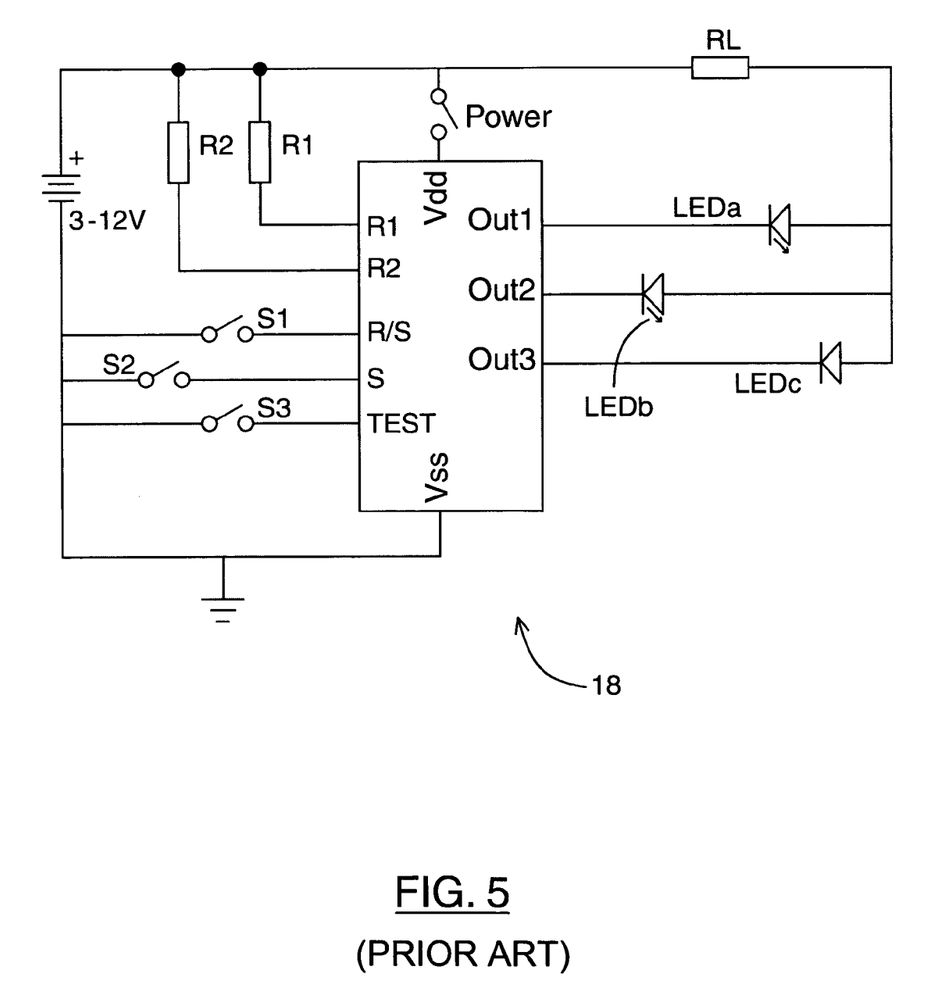
FIG. 5 is a schematic drawing of one example light driving circuit that drives the LED assembly of FIG. 1 of the present invention.

FIG. 5 shows an exemplary implementation of light driver circuit 18 and LED assembly 15. As discussed above, it should be kept in mind that the light driver circuit 18 is optional. Light driver circuit 18 contains logic circuitry that controls the output of LED assembly 15. This circuit can either be a pre-made LED driver chip or it can be a designed chip on board (COB) that can be customized for this application. The preprogrammed sequence controls the appearance of the decorative assembly 10. It is preferred to leave the input connected in order to cause the LEDs of LED assembly 15 to light up in a random order.

The main component is the control circuit 19 that contains the logic circuitry used to control the output of LED assembly 15 The outputs of control circuit 19 are each connected to one of the individual LEDs, LEDa through LEDc, of LED assembly 15. LED assembly 15 itself is connected in series with a load resistor which limits the current passing through the LEDs. The control circuit 18 also has four inputs two of which (R/S and SLEEP) are connected to switches that in turn are connected to Vss. A resistor is connected between each of the other two inputs (R1 and R2) and Vdd. The value of the two resistors, R1 and R2, determine the period of the clock and the length of the sleep time delay respectively.

As will be described below, most embodiments will contain either the sleep switch or the power switch but not both. The SLEEP switch activates the circuitry and also initiates the sleep time delay. Closing the SLEEP switch causes the device to operate for a period of time (the length of the sleep delay) after which the device is disabled. In the preferred embodiment the length of the sleep delay is roughly 30 seconds (e.g. for a bouquet or corsage that is being moved by the user). However, it should be understood that alternatives to the preferred embodiment may be made to operate outside this range without departure from the present invention. Alternatively, the power switch of FIG. 5 could represent the "on/off switch" for decorative assembly 10. In certain embodiments, it may be preferred to allow the user to control the length of time the device operates and so a power switch would be more appropriate. Turning the power on causes the device to operate and the LED assembly 15 to light up until the power switch is toggled off.

As stated earlier, most embodiments will contain either the SLEEP switch or the POWER SWITCH but not both. The choice of switch depends on the particular embodiment. For example, in certain embodiments, such as the corsage or the bouquet, it may be preferred for the device, when activated, to turn on and then after a predetermined period (e.g 30 seconds) shut off. This allows for the user to experience an additional novelty aspect and helps to ensure a longer battery life than would be possible if the device were not to shut off until the user deactivated it.

In contrast, with certain other embodiments it may be preferred to allow the user to have complete control over the activation and deactivation of decorative assembly 10. For example, this may be true for stationary flower arrangements (e.g. long stem arrangements and large hotel reception area arrangements, etc.). In such cases, the user may wish to operate the device for a prolonged period of time and it may be inconvenient to require the user to continually activate the sleep switch each time after the device is automatically deactivated.

The R/S input controls the output state of the device. Connecting the R/S input to VDD causes the LEDs in LED assembly 15 to turn on one at a time in a random order whereas, leaving the input unconnected causes LEDa through LEDc to light up one at a time in a sequential order. It should be understood that although certain embodiments may contain this switch others may not, and even if they do, the switch may be internally preset to a given state during the manufacturing process. If it is preset in such a manner, the user of the decorative assembly 10 may not have access to the switch.

It should be understood that although this exemplary embodiment contains the aforementioned inputs and switches, not all embodiments must do so. Other embodiments may contain fewer or greater inputs and switches depending on the specific implementation. Although most embodiments contain either the sleep or power switch, it is possible for a particular embodiment to contain both switches. Control circuit 18, its functionality and components are described in greater detail below.

Figure 6:
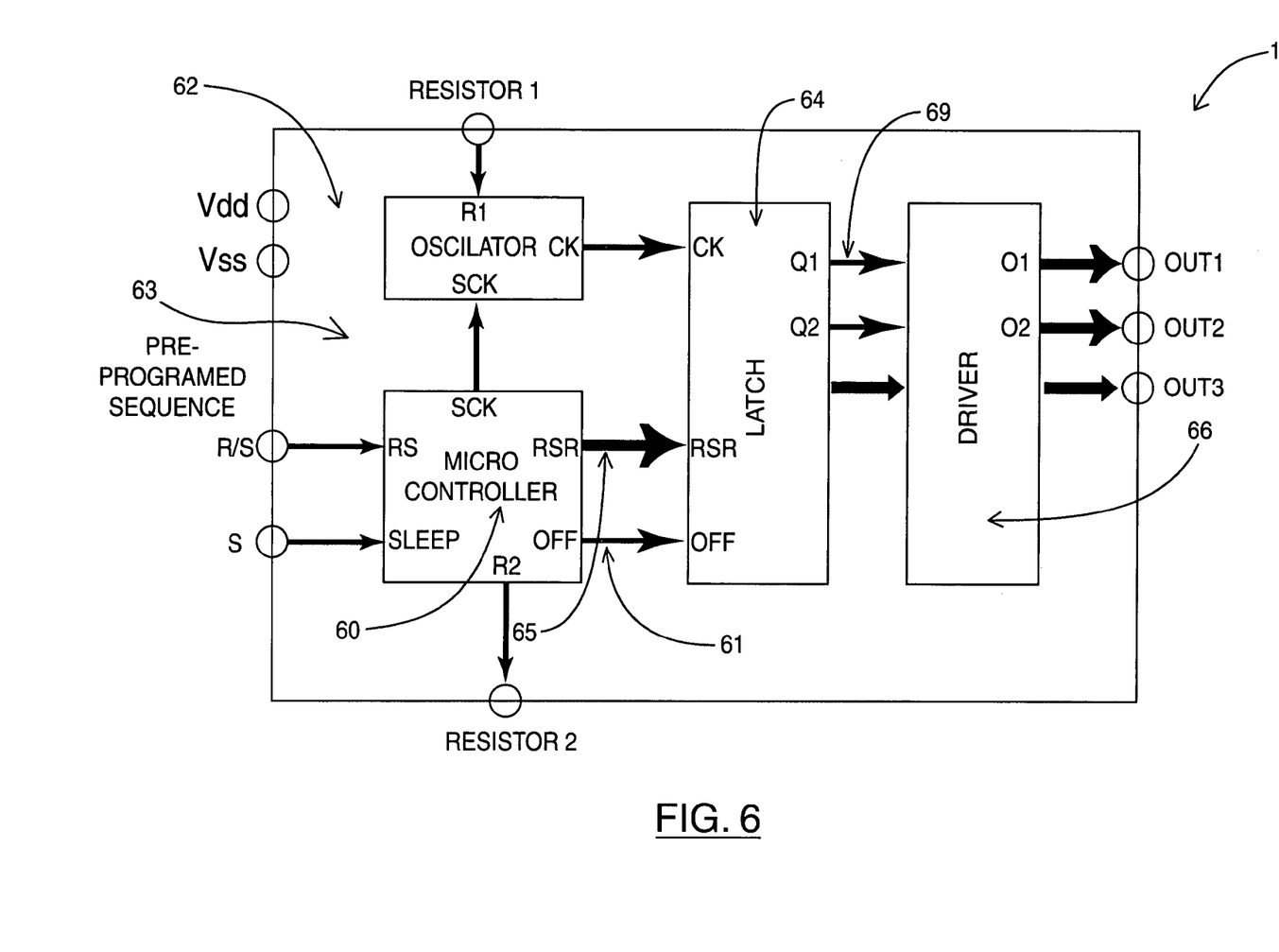
FIG. 6 is a block diagram of an example control circuit of the light driver circuit of FIG. 1.

FIG. 6 illustrates the control circuit 19 of decorative assembly 10 in block diagram form. Specifically, control circuit 19 includes a microcontroller 60, an oscillator 62, a latch 64 and a driver 66. Microcontroller 60 is electrically coupled to oscillator 62, through the SCK line 63, and to latch 64, through the RSR line 65 and OFF line 61. Oscillator 62 is also coupled to latch 64. In turn, latch 64, through information lines 69, is coupled to driver 66 which itself is electrically coupled to the LEDs in LED assembly 15 through output lines. It should be noted that driver 66 is shown having three outputs that correspond in the example implementation being discussed with the three LEDs of LEDS assembly 15 (LEDa, LEDb, LEDc) but that any number of outputs could be provided to drive any number of LEDs within LED assembly 15. Microcontroller 60 determines the output state of the device, which could be random, sequential, or off. This unit has three inputs, R/S (random or sequential), SLEEP and R2 (resistor 2) and three outputs, SK (stop clock), RSR (random or sequential) and OFF.

Microcontroller 60 sends the appropriate digital signal, depending on the state of the R/S switch, through the RSR line 65 to the latch 64, which in turn generates the appropriate output. If the R/S input is connected to Vss then the output is set to random and any of LEDa through LEDc of LED assembly 15 is randomly illuminated. Conversely, if the R/S input is unconnected then each individual LED, LEDa through LEDc, is illuminated in sequence. If the embodiment contains the sleep switch then connecting the SLEEP input to Vss causes microcontroller 60 to enable the clock signal and latch 64 by sending the appropriate digital signals over the SCK 63 and OFF lines respectively. The result is that the device is activated thereby causing LED assembly 15 to emit light. At this time microcontroller 60 also activates a sleep time delay. The length of the time delay is determined by the value of the resistor connected to input R2, which together with an internal capacitance establishes a time constant for the circuit. The device continues to function until the time delay has elapsed, at which point, microcontroller 60 disables the clock signal by sending the appropriate digital signal through the SCK line 63 to oscillator 62. At this time, microcontroller 60 also disables latch 64 by sending the appropriate digital signal through the OFF line. This causes the output to be disabled and the device to shut down.

In the alternative, if the embodiment contains a power switch, then turning the power on enables the clock signal and latch 64. This is achieved by microcontroller 60 sending the appropriate digital signals to oscillator 62 and latch 64 through the SCK and OFF lines. Furthermore, toggling the power switch off causes all components of the circuit to be disconnected from power and therefore no power is produced. Oscillator 22 generates the periodic clock signal which determines the frequency of the output. The oscillator has two inputs, SCK (stop clock) and R1 (resistor 1), and one output, CK (the clock signal). The clock signal is transmitted to latch 64 along the CK line 67. The resistor connected to R1 together with an internal capacitance determines a time constant for the circuit that in turn determines the period of the clock signal. During normal operation, an appropriate digital signal is received from microcontroller 60 along the SCK line 63 and the clock signal is enabled. When the sleep time delay elapses, microcontroller 60 sends an alternative signal via the SCK line 63 and the CK (clock) signal is disabled.

Latch 64 contains the necessary logic in order to generate the appropriate output sequences. Latch 64 has three inputs, CK, RSR and OFF, and a number of outputs equal to the number of LEDs in LED assembly 15. Each output corresponds to a separate LED in LED assembly 15. If the R/S switch is set to random then an appropriate signal is received via the RSR line 65 and latch 64 randomly activates one of its output signals. Similarly, if the R/S switch is set to sequential then an alternative signal is received via the RSR line and latch 64 activates each of its output signals sequentially. Latch 64 may also be programmed to sequence the output in different orders other than randomly or sequentially. During normal operation microcontroller 60 sends an appropriate signal to latch 64 via the OFF line 31, enabling the outputs of latch 64. When the sleep time delay has elapsed, latch 64 receives an appropriate signal from microcontroller 60 via the OFF line. This causes the latch to disable its outputs.

Driver 66 is essentially a buffer between latch 64 and the LED assembly 15. It ensures that sufficient power is supplied to the LEDs in LED assembly 15 and that the current drawn from the latch 64 outputs is not too great. During normal operation, the output of driver 66 tracks the output of latch 24. This circuit description is not intended in a limiting sense but is only meant to provide an illustration of how decorative assembly 10 may be configured. Decorative assembly 10 is not circuit dependant. There are many possible circuit configurations and implementations that may be used in alternative embodiments to achieve a result substantially similar to that described above.

Figure 7:
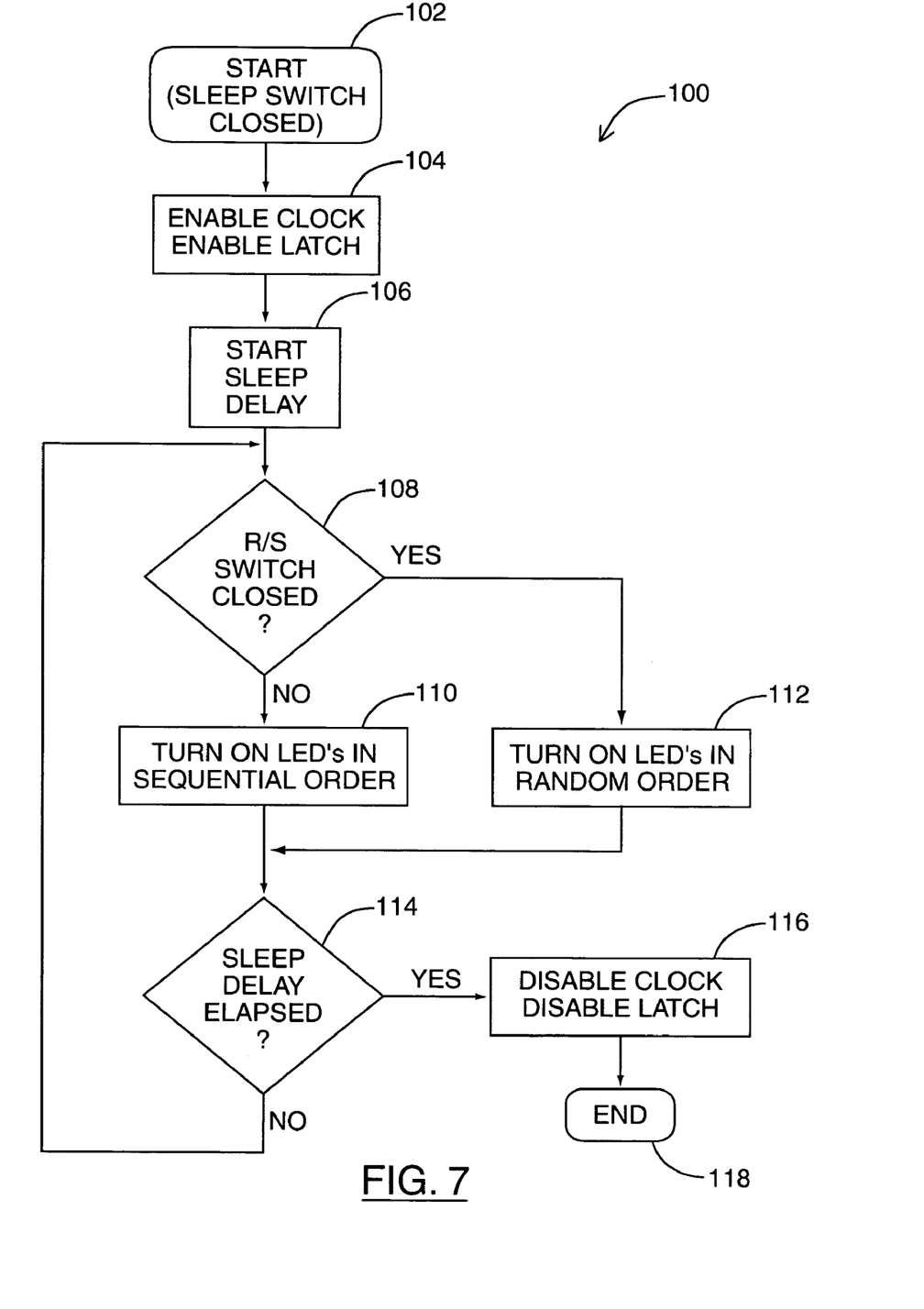
FIG. 7 is a flow-chart illustrating the main steps of the MAIN SLEEP OPERATION routine utilized by the microcontroller to control the output of the LED assembly of FIG. 5.

Reference is now made to FIG. 7, illustrated therein is the MAIN SLEEP OPERATION routine utilized by microcontroller 60, in an embodiment containing the SLEEP switch, to control the output of LED assembly 15. The cycle commences at step (102) when the SLEEP switch closes. At step (104) microcontroller 60 enables the clock signal and latch 64 by sending an appropriate signal through the SCK and OFF lines. Then at step (106) the sleep delay is initiated.

At step (108) microcontroller 60 determines whether or not the R/S input is connected to Vss and sends the appropriate digital signal to latch 64 through the RSR line 25. In turn latch 24 generates the appropriate output at step (110) or (112). If the input is connected to Vss, then at step (112) the LEDs in LED assembly 15 are turned on in random order. Otherwise, at step (110) the LEDs in LED assembly 15 are turned on in sequential order. Then at step (114) microcontroller 60 determines whether or not the time delay has elapsed. If the time delay has not elapsed, then the routine cycles back to step (108) and repeats itself. Alternatively, if the time delay has elapsed, then at step (116), microcontroller 60 disables the clock and latch 64 by sending the appropriate signals over the SK and OFF lines. The device is then inactive until the SLEEP switch is closed again at step (102).

Figure 8:
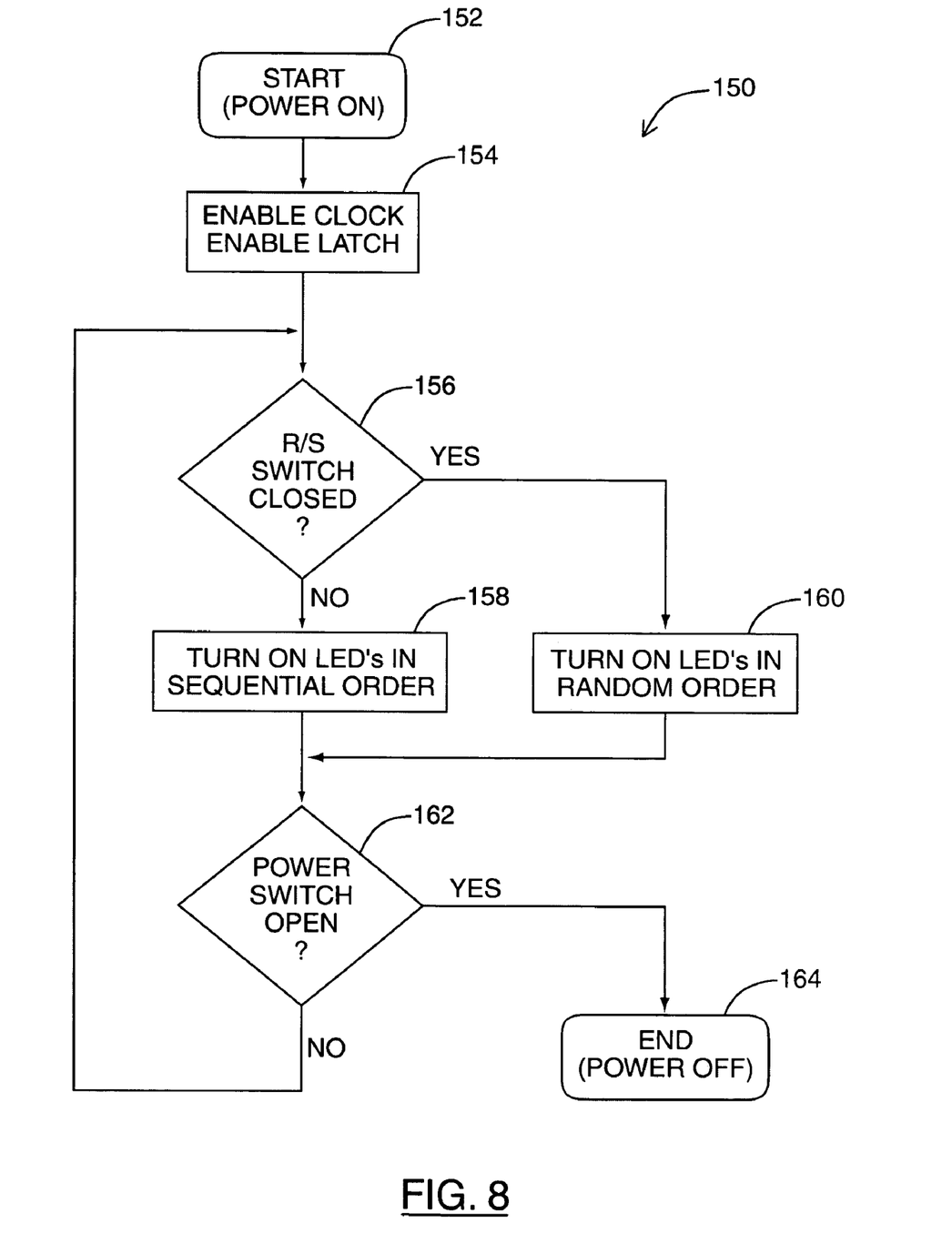
FIG. 8 is a flow-chart illustrating the steps of the MAIN OPERATION routine utilized by the present invention in an embodiment containing the power switch.

Reference is now made to FIG. 8, illustrated therein is the MAIN POWER OPERATION routine utilized by control circuit 18, in an embodiment containing the power switch, to control the output of LED assembly 15. The routine commences at step (152) when the power switch is closed. At step (154) microcontroller 60 enables the clock signal and latch 64 by sending appropriate signals through the SK and OFF lines.

At step (156) microcontroller 60 determines whether or not the R/S input is connected to Vss and sends the appropriate digital signal to latch 64 through the RSR line 65. In turn latch 64 generates the appropriate output at step (158) or (160). If this input is connected to Vss, then at step (160) the LEDs in LED assembly 15 are turned on in random order. Otherwise, at step (158) the LEDs in LED assembly 15 are turned on in sequential order. Then at step (162) it is determined whether or not the power switch has been opened. If the power switch has not been depressed then the routine cycles back to step (156). Alternatively, if the power switch has been opened then at step (164), the power is turned off and the device is inactive until the power switch is turned on again at step (152).

As will be apparent to persons skilled in the art, various modifications and adaptations of the structure described above are possible without departure from the present invention, the scope of which is defined in the appended claims.

The invention claimed is:

1. A decorative assembly for use within a floral arrangement, said decorative assembly comprising:
   (a) a plurality of optical fibers, each having a first end and a second end, each optical fiber having an end face at the first end;
   (b) first and second light emitting diodes each having a top;
   (c) a first tubular connector for coupling the top of the first light emitting diode to the end face at the first end of one of said optical fibers and a second tubular connector for coupling the top of the second light emitting diode to the end face at the first end of another one of said optical fibers to allow for illumination of said at least one of said optical fibers;

(d) a base portion for housing said first and second lighting emitting diodes and at least a portion of said optical fibers;

(e) a power source coupled to said first and second light emitting diode;

(f) said plurality of optical fibers being illuminated such that the light emitted at the second end of said optical fibers creates an aesthetically decorative effect within the floral arrangement; and (g) a light driver circuit coupled between said power source and said first and second light emitting diodes for selectively activating the first and second light emitting diodes wherein said light driver circuit is adapted to randomly activate said first and second light emitting diodes.

2. The decorative assembly of claim 1, wherein the optical fibers have the same length.

3. The decorative assembly of claim 1, wherein at least two optical fibers have differing lengths.

4. The decorative assembly of claim 1, wherein the optical fibers have the same diameter.

5. The decorative assembly of claim 1, wherein at least two of the optical fibers have differing diameters.

6. The decorative assembly of claim 1, wherein an outer surface of at least one of the plurality of the optical fibers is covered with a coating adapted to ensure that light is primarily emitted from the second end of the at least one of the plurality of the optical fibers.

7. The decorative assembly of claim 6, wherein at least a portion of the coating on the outer surface of at least one of the plurality of the optical fibers is removed to form an opening, such that light is allowed to escape through the opening.

8. The decorative assembly of claim 1, wherein said first and second light emitting diodes emit the same color.

9. The decorative assembly of claim 1, wherein said first and second light emitting diodes emit differing colors.

10. The decorative assembly of claim 1, wherein at least one of said first and second light emitting diodes emits a plurality of different colors.

11. The decorative assembly of claim 1, wherein said light driver circuit is adapted to activate said first and second lighting emitting diodes by applying gradually changing levels of power from said power source such that a gradual fade effect is created.

12. The decorative assembly of claim 1, wherein a first optical fiber has a first length, a second optical fiber has a second length, and wherein said light driver circuit selectively activates said first and second light emitting diodes such that the first and second optical fibers are activated separately and in turn to create a waterfall lighting effect.

* * * * *